(12) United States Patent
Ge et al.

(10) Patent No.: US 9,353,673 B2
(45) Date of Patent: May 31, 2016

(54) ENGINE FAN CONTROL SYSTEM AND METHOD

(71) Applicant: Caterpillar Inc., Peoria, IL (US)

(72) Inventors: Xinyu Ge, Peoria, IL (US); Kai Zhang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/522,368

(22) Filed: Oct. 23, 2014

(65) Prior Publication Data

US 2016/0115856 A1    Apr. 28, 2016

(51) Int. Cl.
*F01P 7/04* (2006.01)
*F04D 19/00* (2006.01)

(52) U.S. Cl.
CPC .............. *F01P 7/04* (2013.01); *F04D 19/002* (2013.01)

(58) Field of Classification Search
CPC .............. F01P 7/04; F01P 7/02; F01P 5/02; F01P 5/04; F01P 2001/00; F01P 2001/02; F01P 2005/02; F04D 19/002
USPC ........ 123/41.12, 41.48, 41.49, 41.65; 236/35; 701/36; 180/68.1; 165/244, 246, 247
See application file for complete search history.

(56) References Cited

U.S. PATENT DOCUMENTS

| | | | |
|---|---|---|---|
| 6,109,219 A | 8/2000 | Sano | |
| 6,253,716 B1 | 7/2001 | Palmer et al. | |
| 6,571,751 B2 | 6/2003 | Vogt | |
| 6,772,714 B2 * | 8/2004 | Laird | F01P 7/042 123/41.12 |
| 7,267,085 B2 | 9/2007 | Joyce et al. | |
| 7,310,959 B2 * | 12/2007 | Braun | F01P 7/048 123/41.11 |
| 7,407,046 B2 * | 8/2008 | Bhat | F16D 35/024 192/58.61 |
| 7,841,837 B2 * | 11/2010 | Chen | H05K 7/20209 307/139 |
| 7,863,839 B2 * | 1/2011 | Schuricht | F01P 7/044 123/41.12 |
| 8,714,116 B2 * | 5/2014 | Hartman | F01P 7/042 123/41.01 |
| 2003/0014171 A1 | 1/2003 | Ma et al. | |
| 2010/0064991 A1 | 3/2010 | Mizoguchi et al. | |
| 2012/0288377 A1 | 11/2012 | Hartman et al. | |
| 2013/0333364 A1 | 12/2013 | Carpenter et al. | |

FOREIGN PATENT DOCUMENTS

WO    2013029794 A1    7/2013

* cited by examiner

*Primary Examiner* — Grant Moubry
(74) *Attorney, Agent, or Firm* — Miller, Matthias & Hull LLP (57) ABSTRACT

This document discloses an adaptive fan control system for controlling a fan that cools an engine of a machine. Many machines carry out repetitive tasks or work cycles. The cooling requirements of the engine vary for each portion or segment of a work cycle. The disclosed system includes a controller with a memory having a plurality of stored work cycle patterns. Using a variety of sensors, the system and controller identifies the work cycle that the machine is carrying out and, using one of the stored work cycle patterns, the system anticipates the cooling requirements of the machine as the machine progresses through the work cycle and the system proactively changes the fan speed for upcoming segments of the work cycle.

20 Claims, 5 Drawing Sheets

ENGINE FAN CONTROL SYSTEM AND METHOD

TECHNICAL FIELD

This document discloses fan control systems and methods of controlling the speed of a fan used to cool an engine used to power a stationary or mobile machine.

BACKGROUND

Engines used to power mobile and stationary machines generate substantial amounts of heat during operation. Heat, if not properly dealt with, can reduce fuel efficiency and/or cause damage to engine and/or machine components. Such engines typically include cooling systems to remove heat from the engine during operation. The cooling systems may include, among other things, a fan configured to draw heat away from, and/or push cooling airflow toward the engine.

In a typical cooling circuit for an internal combustion engine, coolant passes through a jacket surrounding the engine as the coolant temperature rises. The coolant then passes through the radiator, entering the radiator through a manifold and then passing through cooling tubes where air flows over the tubes to remove heat from and to reduce the temperature of the coolant. The coolant re-circulates via a second manifold back to the engine. Such cooling systems generally have a coolant pump for pumping the coolant through the engine coolant circuit. A valve prevents coolant from circulating through the radiator while the engine is warming up. The engine fan draws air through the radiator to remove heat from the coolant.

Many engines are equipped with a single-speed fan. Typical control methods for cooling such engines may be based on coolant temperature. A controller may instruct various actuators to open or close the coolant valve and switch the fan on and off. The speed of the coolant pump may also be controlled.

However, due to varying conditions, which may be environmental or workload based, it may be beneficial to run the fan at a variable speed. For example, an on-highway truck hauling a load up a steep incline on a hot summer day may require more cooling than the same truck idling at a stop on a cold winter day. While it may be necessary and/or efficient to run the fan at a high speed under the former circumstance, it may be unnecessary and/or inefficient to run the fan at the same high speed under the later circumstance. As such, there is a need to regulate or control fan speed in response to changing environmental or workload conditions.

Control of an engine fan may provide a number of benefits. For example, a properly controlled engine fan may protect against engine overheating. Further, fan control may improve fuel efficiency by adjusting fan speed to provide only the necessary cooling capacity in response to machine, engine, transmission and environmental conditions. Because an engine fan consumes power from the engine, minimizing the power consumed by the fan will improve fuel efficiency. Further, a properly controlled engine fan helps to regulate emissions as an engine fan may affect the intake manifold air temperature (IMAT), which dramatically affects engine emissions, such as NOx, CO and particulate matter (PM).

As shown in U.S. Pat. No. 7,863,839, an engine fan control system may be based on determining a desired fan speed, making any necessary corrections, and adjusting the fan speed accordingly. The desired fan speed may be determined in response to parameter signals provided by various sensors, such as IMAT, coolant temperature, hydraulic fluid temperature, transmission oil temperature, engine oil temperature, cabin temperature and other parameters. While the fan control system of the '839 patent adjusts the fan speed based on one or more parameters, e.g., coolant temperature, it still takes time for the action of the fan to change the coolant to the desired coolant temperature. Thus, there is a time lag between the determination of the desired fan speed and the desired effect. This time lag may result in certain engine components experiencing thermal fatigue, reduced fuel economy and increased emissions or emission shifting. The time lag problem is also exacerbated in certain machine work cycles where the engine workload and other environmental conditions may change continuously.

For example, when an excavator performs a dig movement or a dig segment of a work cycle, the required engine power increases immediately as well as the heat transferred to the engine coolant. However, it takes time for the coolant temperature to increase. By the time a traditional fan speed controller detects the temperature change and calculates a new desired fan speed, the excavator might already be performing a different segment of the work cycle, such as a swing segment and/or a dump segment. The required engine power decreases during these segments and therefore the cooling requirements decrease, but desired fan speed may remain unnecessarily at a maximum value due to the time lag.

Thus, a need exists for a fan control system and method of controlling an engine fan that overcomes these problems.

SUMMARY OF THE DISCLOSURE

In one aspect, this document discloses a method for proactively controlling a fan speed of a cooling fan for a machine. The machine may be used to carry out a variety of repetitive work cycles. The machine may include a plurality of machine sensors for detecting current operating conditions of the machine. The machine may further include at least one controller linked to the plurality of machine sensors. The controller may include a memory. The method may include storing a plurality of work cycle patterns in the memory of the controller. Each work cycle pattern may include a plurality of fan speeds for periodic cooling requirements of the machine during one of the work cycles of the machine. The method may further include periodically sensing current operating conditions of the machine. The method may further include identifying a work cycle pattern stored in the memory that is being repeated by the machine. The method may further include periodically adjusting the fan speed to meet the periodic cooling requirements of the identified work cycle pattern as the machine repeats the work cycle.

In another aspect, this document discloses an adaptive fan speed control system for controlling a fan that cools an engine of a machine. The machine may also include a transmission. The system may include a plurality of machine sensors for detecting current operating conditions of the machine, a plurality of engine sensors for detecting current operating conditions of the engine and at least one transmission sensor for detecting current operating conditions of the transmission. The machine may further include at least one controller linked to the plurality of machine, engine and transmission sensors. The controller may include a memory with the plurality of work cycle patterns stored in the memory. Each work cycle pattern may include a plurality of segments and a plurality of fan speeds with at least one fan speed designated for each segment of each work cycle pattern. The controller may be linked to the fan for controlling fan speed. The controller may be configured to identify one of the plurality of work cycle patterns stored in the memory that is being repeatedly carried out by the machine. The controller may be further configured to periodically adjust the fan speed for each segment of the identified work cycle pattern to meet the periodic cooling requirements of the identified work cycle pattern as the machine repeats the identified work cycle pattern.

In another aspect, this document discloses a machine that may include an engine and a transmission. The machine may further include a plurality of machine sensors, a plurality of engine sensors and at least one transmission sensor for detecting current operating conditions of the machine, engine and transmission respectively. The controller may further include a memory with a plurality of work cycle patterns stored in the memory. Each work cycle pattern may include a plurality of segments and a plurality of fan speeds with at least one fan speed designated for each segment. The controller may be linked to the fan for controlling the fan speed. The controller may be configured to identify one of the plurality of work cycle patterns stored in the memory that is being repeatedly carried out by the machine. Further, the controller may be configured to periodically adjust the fan speed for each segment of the identified work cycle pattern to meet the periodic cooling requirements of the identified work cycle pattern as the machine repeats the identified work cycle pattern.

The features, functions, and advantages discussed above may be achieved independently in various embodiments or may be combined in yet other embodiments, further details of which can be seen with reference to the following description and drawings.

BRIEF DESCRIPTION OF THE DRAWINGS

For a more complete understanding of the disclosed methods and apparatuses, reference should be made to the embodiments illustrated in greater detail on the accompanying drawings, wherein.

The drawings are not necessarily to scale and illustrate the disclosed embodiments diagrammatically and in partial views. In certain instances, this disclosure may omit details which are not necessary for an understanding of the disclosed methods and apparatuses or which render other details difficult to perceive. Further, this disclosure is not limited to the particular embodiments illustrated herein.

DETAILED DESCRIPTION OF THE PRESENTLY PREFERRED EMBODIMENTS

Figure 1:
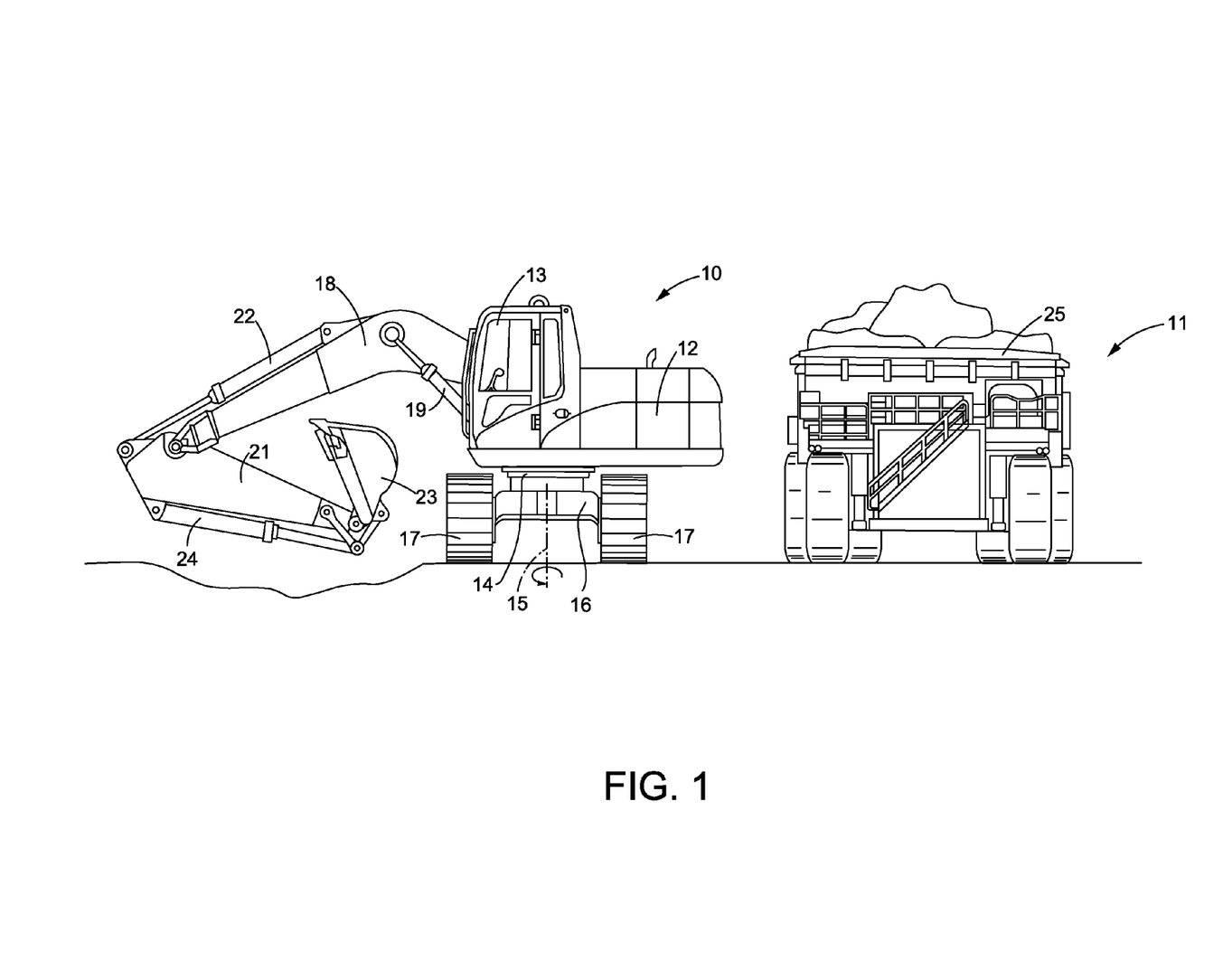
FIG. 1 illustrates an excavator in position to perform a dig segment of a typical repetitive work cycle that may also include a lift segment, a swing segment that places the bucket over the truck bed, followed by a dump segment and followed by another swing segment that returns the excavator to the position shown in FIG. 1.
Figure 2:
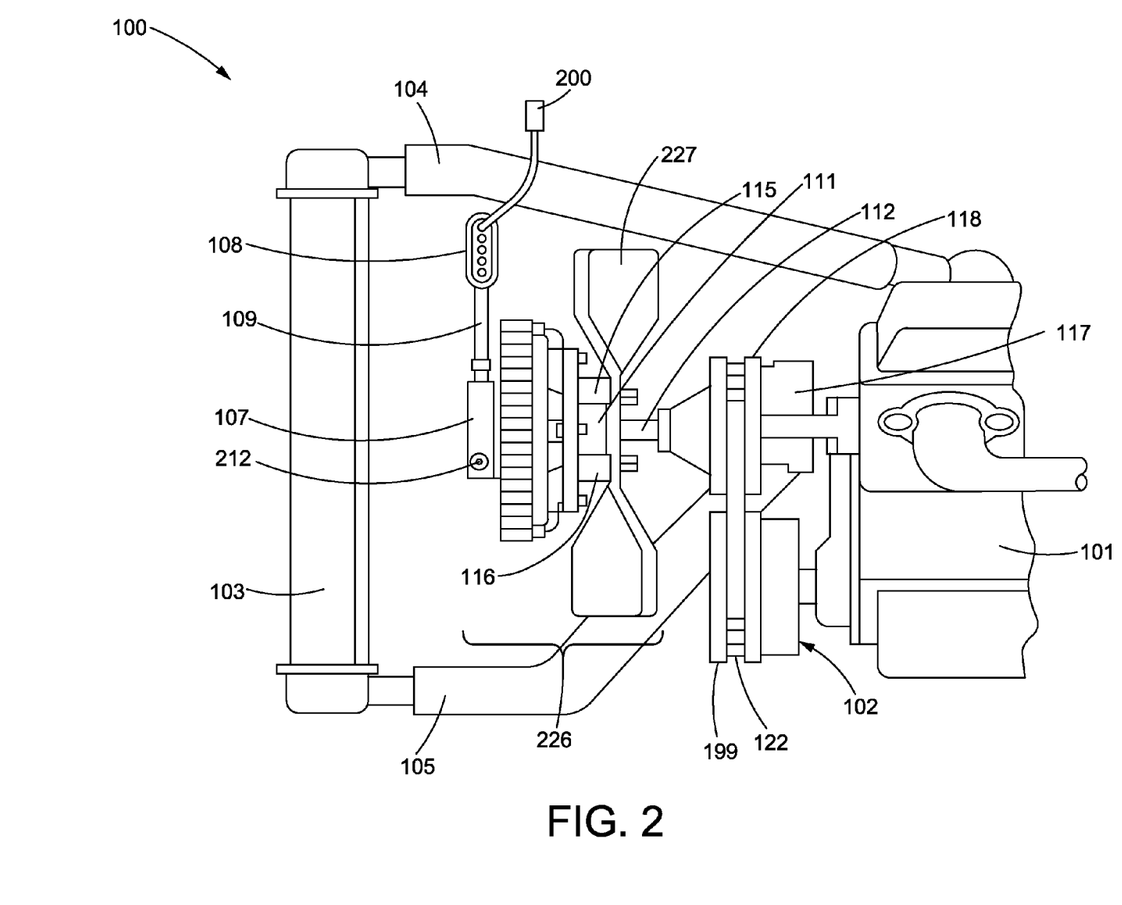
FIG. 2 is a side plan view of a fan cooling system that may be controlled using the fan control system and method of this disclosure.

FIG. 1 illustrates an excavator 10 and a truck 11, both of which may include engines (not shown) with certain cooling requirements that may be satisfied at least in part by a fan cooling system 100 (also not shown in FIG. 1; see FIG. 2). The excavator 10 may include a chassis 12 and a cab 13, which may be supported by a turret 14. The turret 14 may be rotatable about a vertical axis 15. The turret 14 may be supported by an undercarriage 16, which may include or be coupled to numerous components for driving the ground engaging elements, which may be a pair of tracks 17. The chassis 12 may be coupled to a boom 18 and a boom cylinder 19. The boom 18 may be coupled to a stick 21 and a stick cylinder 22. The stick 21 may be coupled to a bucket 23 and a bucket cylinder 24.

In a typical cyclic or repetitive work cycle, the excavator 10 may carry out a dig operation or a dig segment in the position shown in FIG. 1 where the bucket 23 is at least partially filled with material. After the bucket 23 is raised during a lift segment, the excavator 10, or more specifically, the turret 14 of the excavator 10, may rotate about the vertical axis 15 during a swing segment to place the bucket 23 in a position over the bed 25 of the truck 11. Then, in a dump segment of the work cycle, the contents of the bucket 23 may be dumped onto the bed 25. Finally, the turret 14 may rotate back to the position shown in FIG. 1 in another swing segment to start a new work cycle, beginning with another dig segment.

In summary, the work cycle illustrated in FIG. 1 may include a dig segment, a lift segment, a swing segment, a dump segment and another swing segment. Such a work cycle may also be divided into more than five segments. Regardless, the dig segment and lift segment consume more energy and power from the engine than the swing segments or the dump segment. Thus, the cooling needs of the engine decrease for the swing and the dump segments and increases for the dig and lift segments. Disclosed herein is a system and method for recognizing when a machine, like the excavator 10 (or the truck 11), is carrying out a repetitive work cycle, and for anticipating the cooling needs of the engine for future segments of the recognized work cycle. In short, the disclosed method and system recognizes a repetitive work cycle pattern and increases or decreases the speed of the fan in accordance with the increased or decreased cooling needs of the engine for upcoming segments of the work cycle.

FIG. 2 illustrates a side view of a fan cooling system 100 for an engine 101 in which embodiments of this disclosure may be incorporated. The fan cooling system 100 may be incorporated into various types of machines, for example, an excavator 10, a truck 11, a tractor, or other machines that may be powered by an internal combustion engine 101. The fan cooling system 100 may be positioned to draw ambient cooling air from outside the machine across machine components, such as the radiator 103, to assist in the transfer of heat (e.g., cooling) from such machine components.

A portion of the engine 101 is shown to the right of a fan pulley assembly 102. The engine 101 may be an internal combustion type engine. The engine 101 may be connected to the radiator 103 by a pair of interconnecting hoses including an inlet hose 104, through which liquid coolant travels from the engine 101 to the radiator 103 via the inlet hose 104 and back to the engine 101 via the outlet hose 105.

A fan drive 226 may be disposed between the engine 101 and the radiator 103 and between the inlet hose 104 and outlet hose 105. The fan drive 226 may include an electrical actuator assembly 107. The electrical actuator assembly 107 may be connected to an electrical pin connection 108 via an electrical conduit 109 that houses one or more electrical wires (not shown). Pin leads at the electrical pin connection 108 may be further connected to power supply modules (not shown) and grounding located elsewhere in the machine. Other pin leads are connected to a fan control system 200, which is further described with reference to FIGS. 3-4. Electronic signals from the fan control system 200 provide fan speed commands to the fan drive 226. Other pin leads are connected to the fan control system 200, providing the fan control system 200 with a sensed or detected fan speed from a fan speed sensor 212 located within the electrical actuator assembly 107. The fan speed sensor 212 may be a Hall effect type speed sensor. In some embodiments, the desired fan speed is implemented in an electronic closed-loop feedback to and from the fan control system 200 for controlling the fan speed.

The fan drive 226 may also include an input shaft 112 and an input member 111 that houses an internal clutch plate (not shown). The input shaft 112 may be mounted to the fan pulley assembly 102. In other fan cooling systems, a fan clutch may be mounted to an engine crankshaft pulley, or to a water pump pulley. The fan 227 may be attached to an upper fan mounting surface 115 and a lower fan mounting surface 116. The speed of the fan 227 may be varied by controlling a solenoid operated hydraulic control valve (not shown) housed within or in proximity to the electrical actuator assembly 107. The solenoid operated hydraulic control valve may receive fan speed command signals via the electrical conduit 109 from the fan control system 200 to control the amount of clutch engagement and thus the speed of the fan 227.

The input shaft 112 may be mounted to a coolant pump 117. Both the input shaft 112 and the coolant pump 117 may be driven by the fan pulley assembly 102. The fan pulley assembly 102 may include a top pulley 118 and bottom pulley 119 connected via the belt 122. The engine 101 drives the bottom pulley 119 to rotate the belt 122, thereby driving the top pulley 118. The top pulley 118 drives the input shaft 112 to rotate the fan 227. The speed available for the bottom pulley 119 is limited by the speed of the engine 101 or the engine rpm. Therefore, the maximum speed of the fan 227 depends on the engine rpm operating at a full throttle.

Different types of fan configurations may be utilized for the fan cooling system 100, other than the fan drive 226 described above. For example, a variable sheave fan drive may be utilized wherein the variable adjustments to fan rotation are conducted by an electronic controller by varying the diameter of pulleys connected to the fan 227 and the engine 101. Other fan drives that may be utilized include hydraulic fan drives or an electric fan or an array of electric fans.

Figure 3:
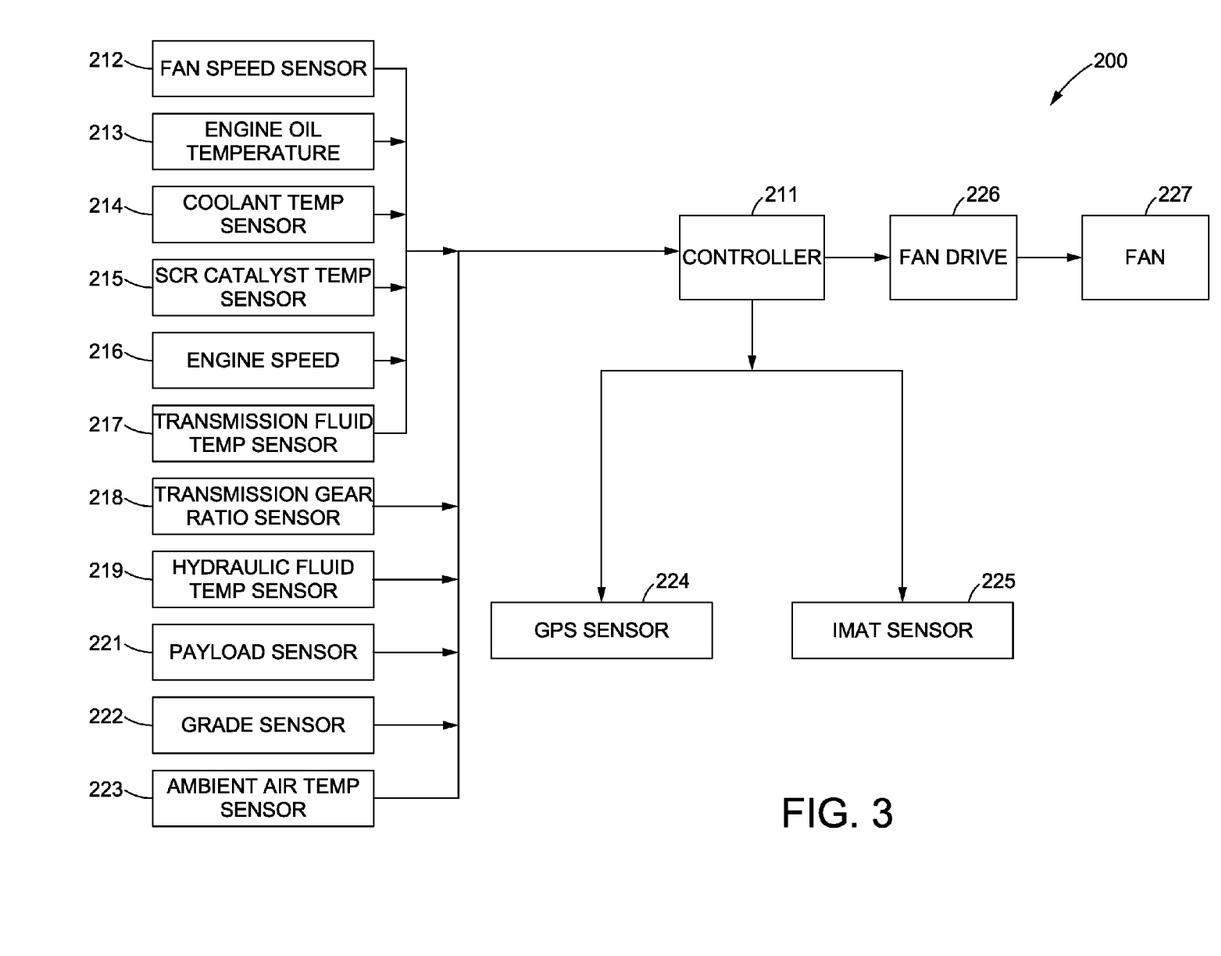
FIG. 3 schematically illustrates the sensors, controller and fan cooling system of a disclosed adaptive fan speed control system.

FIG. 3 schematically illustrates the use of a plurality of sensors in an adaptive fan control system 200. The fan control system 200 includes a controller 211 that may be linked to a plurality of sensors, including, but not limited to a fan speed sensor 212, an engine oil temperature sensor 213, a coolant temperature sensor 214, a selective catalyst reduction (SCR) catalyst temperature sensor 215, an engine speed sensor 216, a transmission fluid temperature sensor 217, a transmission gear ratio sensor 218, a hydraulic fluid temperature sensor 219, a payload sensor 221, a grade sensor 222, an ambient air temperature sensor 223, a global positioning system (GPS) sensor 224, and an intake manifold air temperature (IMAT) sensor 225. Each of these sensors may be linked to the controller 211. The controller 211 may also be linked to the fan drive 226.

Figure 4:
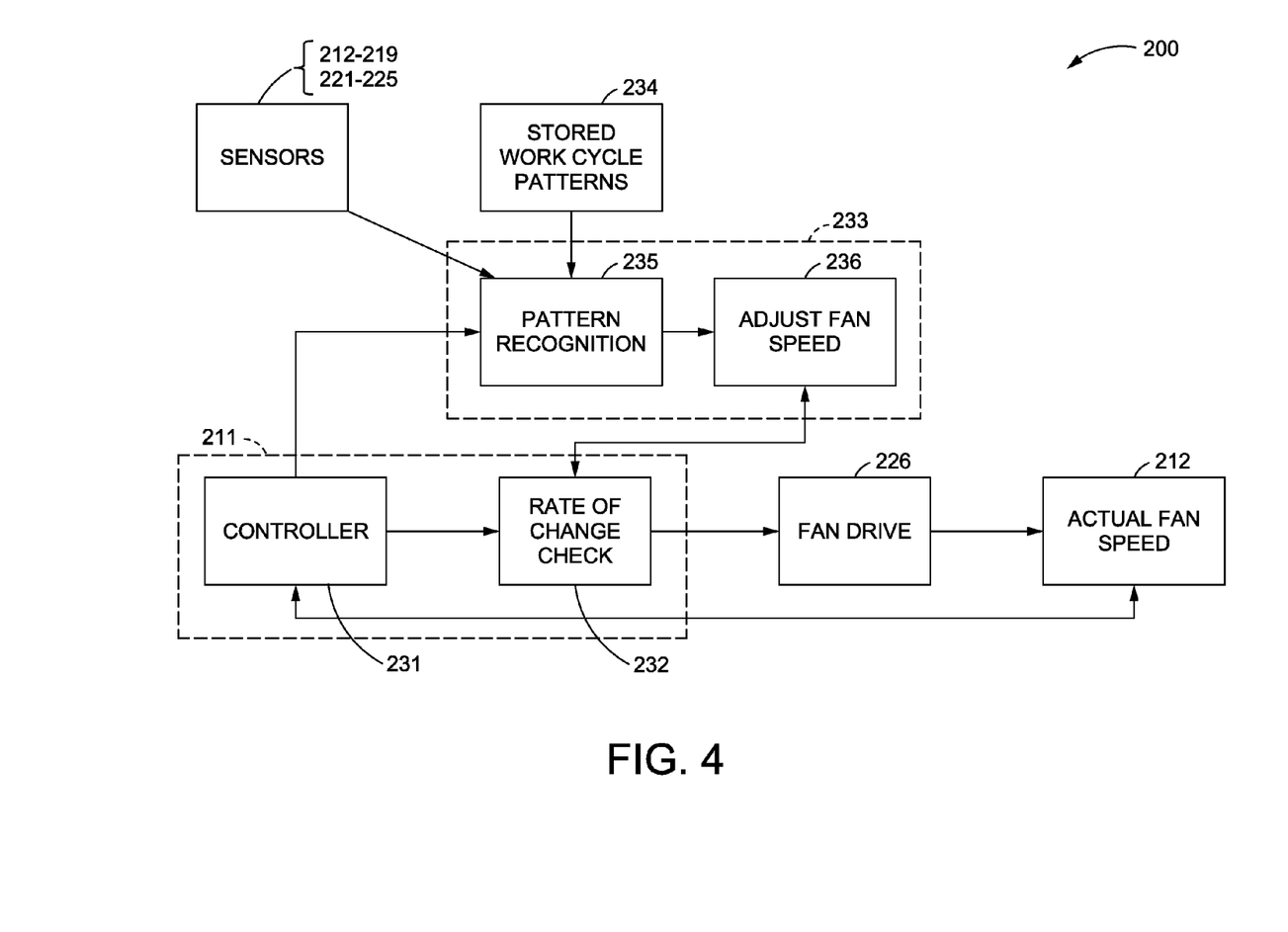
FIG. 4 is another schematic illustration of the disclosed adaptive fan speed control system.

As shown in FIG. 4, the controller 211 may form part of a control module 231 that may include a rate of change check sub-module 232 that may require any change inputted to the fan drive 226 to fall within pre-determined range (e.g., +/− 150 rpm). The controller 211 may include or be linked to an adaptive adjustment module 233. The adaptive adjustment module 233 receives information either directly or by way of the controller 211 from the sensors 212-219, 221-225. The controller 211 may also include a memory 234 having a plurality of work cycle patterns stored therein. The stored work cycle patterns may vary greatly, as indicated below. The adaptive adjustment module 233 includes a pattern recognition sub-module 235 that periodically receives data from the sensors 212-219, 221-225 and compares the data received periodically from the sensors 212-219, 221-225 with the plurality of work cycle patterns stored in the memory 234. The adaptive adjustment module 233 or, more specifically the pattern recognition sub-module 235, compares the data from the sensors 212-219, 221-225 against the work cycle patterns stored in the memory 234 to determine if the machine is carrying out a known repetitive work cycle.

One example of a repetitive work cycle that may be stored as a work cycle pattern is that of an excavator 10 that is repeatedly performing a work cycle that includes the following segments: dig, lift, swing to dump position, dump, swing back to dig position, etc. The dig segment of this work cycle requires more work by the excavator 10, a greater cooling requirement and therefore an increased fan speed. Conversely, other segments of the above work cycle do not require as much work and the fan speed can be reduced, such as during the swing and dump segments of the above cycle. Reducing the fan speed for less demanding segments of the cycle saves fuel costs.

The pattern recognition sub-module 235 identifies a work cycle that is being repeated by a machine, compares that work cycle against work cycle patterns stored in a memory 234 and, using a probability match or other suitable matching technique, determines which stored work cycle pattern best fits the repetitive work cycle that the machine is currently carrying out. The pattern recognition sub-module 235 identifies the appropriate stored work cycle pattern after a number of iterations. Once a work cycle pattern stored in the memory 234 is identified by the pattern recognition sub-module 235, the appropriate fan speed is determined by the adjust fan speed sub-module 236 for the particular segment of the work cycle that the machine is currently carrying out. The appropriate fan speed is transmitted to the rate of change check sub-module 232 and the controller 211 similarly transmits the actual fan speed from the sensor 212 to the rate of change check sub-module 232, which determines whether the difference between the actual fan speed and the desired fan speed is within a predetermined limit. If the desired change in fan speed is within the predetermined limit, a signal is sent to the fan drive 226 to adjust the fan speed accordingly. If the difference between the desired fan speed and the actual fan speed is greater than the pre-determined limit, the rate of change check sub-module 232 adjusts the desired fan speed downward until the difference between the actual fan speed and the desired fan speed falls within the predetermined range. The process is repeated until the desired fan speed is met.

Figure 5:
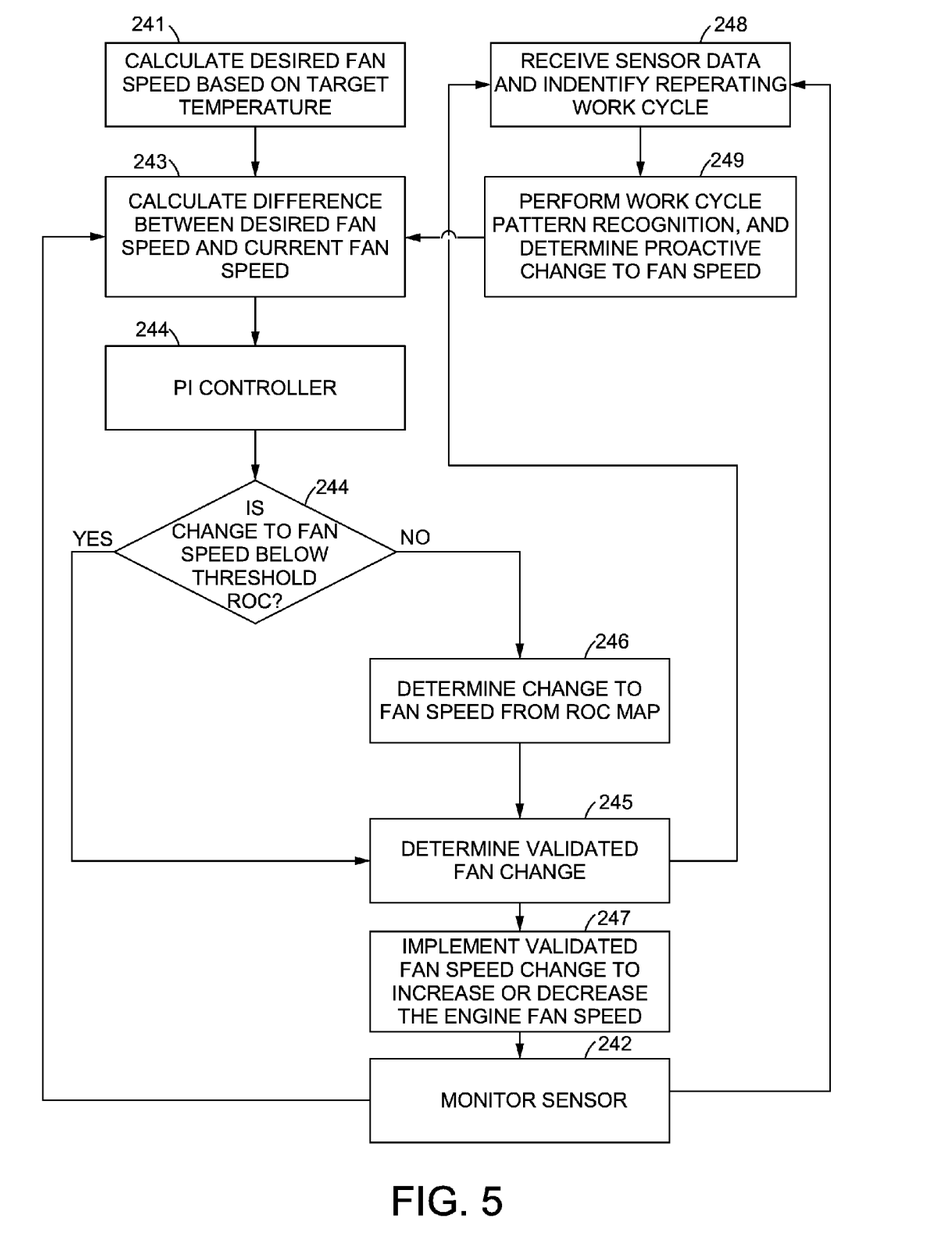
FIG. 5 schematically illustrates a disclosed method for proactively controlling the fan speed of a machine or vehicle.

FIG. 5 is a flow chart illustrating the disclosed method for proactively controlling the speed of the fan 227. At 241, a desired fan speed is calculated based on a target temperature, e.g., engine coolant temperature or another suitable target temperature. Further, the actual fan speed is detected at 242 and the difference between the desired fan speed and the actual fan speed is calculated at 243. The controller 211 then determines at 244 if the difference between the desired fan speed and the current fan speed falls below the threshold rate of change. If the difference is below the threshold rate of change, a validated fan speed change is determined at 245. If the difference is above the threshold rate of change, an appropriate rate of change below the rate of change limit may be determined using a rate of change map at 246. Alternatively, the validated fan change at 245 may be reached in increments that may be all or part of the rate of change threshold limit. After the validated fan speed change is determined at 245, the validated fan speed change is implemented at 247 and the process repeats until the desired fan speed is reached.

Contemporaneously, sensor data is received and a repeating work cycle pattern is identified at 248. The work cycle pattern recognition is performed at 249 and, if there is a match according to the operating conditions from the period $t_{-a}$ to $t_0$, the adaptive adjustment module 233 will determine the desired fan speed for each segment of the identified work cycle. This information is used by the controller 211 during the calculation of the difference between the desired fan speed and the current fan speed at 243.

After the adaptive adjustment module 233 determines the match probability and a weighting factor vector, the controller 211 will perform the following calculations to determine the final desired fan speed value.

$$\text{Desired Fan Speed} = \mathscr{F}(\vec{N}, \vec{S}, P_{m\_cycle}) \quad (1)$$

A linear example is given below as equation (2):

$$\text{Desired Fan Speed} = (1 - P_{m\_cycle}) * S_0 + P_{m\_cycle} * (N_1 * S_1 + N_2 * S_2 + \ldots + N_m * S_m) \quad (2)$$

where $P_{m\_cycle}$=the probability of match, when the probability is greater than a 50% threshold value, $P_{m\_cycle}$=0, when probability is equal to or less than the 50% threshold value, $S_0$=desired fan speed based on the target temperature at to.
$S_1$=predetermined fan speed associated with the segment 1 of a known work cycle,
$S_2$=predetermined fan speed associated with the segment 2 of a known work cycle,
$S_m$=predetermined fan speed associated with the segment m of a known work cycle,
$N_1$=weighting factor for the segment 1 of a known work cycle,
$N_2$=weighting factor for the segment 2 of a known work cycle, and
$N_m$=weighting factor for the segment m of a known work cycle.

If there is a non-match between the current operating conditions and the work cycle patterns stored in the memory 234, the non-trivial part of the equation (2) is $S_0$, and the desired fan speed is purely based on the target temperature. When there is a match with a stored work cycle pattern, the predetermined fan speed for the stored work cycle pattern superimposes onto the fan speed value based on the thermal model/target temperature according to equation (2). In one extreme case, if there is a perfect match, i.e., $P_{m\_cycle}$ equals 1, the non-trivial part of equation (2) is $P_{m\_cycle} * (N_1 * S_1 + N_2 * S_2 + \ldots + N_m * S_m)$ and the desired fan speed is totally based on the predetermined value for each segment of the stored work cycle pattern. Since the thermal model/heat transfer model usually lacks radiation information, the fan speed based on target temperature includes a radiation heat transfer assumption. The directly measured fan speed, that can be saved during the calibration, typically provides better temperature control.

The weighting factors $N_1$, $N_2$, $N_m$ may be more heavily biased for increments of time closer to the present time. As a result, the weighting factors $N_1$, $N_2$, $N_m$ may become smaller for increments of time further into the future, such that the weighting factors have less effect for more distant events that have not yet occurred. When the controller 211 includes future segments into the fan speed determination, a more continuous fan speed is achievable.

INDUSTRIAL APPLICABILITY

This application discloses a fan control system 200 that can anticipate the need for an increased cooling by the fan 227 of a machine by recognizing repetitive actions carried out by the machine as a pattern and comparing the pattern to a database of stored work cycle patterns. By identifying which stored machine work cycle pattern mirrors the activity currently being undertaken by the machine, the fan control system 200 can proactively control fan speed as a function of upcoming need. For example, a truck 11 at a mine site might repeatedly take a route between a pickup location and a dump location. Portions of the route may be uphill or downhill, and may be travelled by the truck 11 with or without a load. After a few repeated cycles, the disclosed system may use a stored work cycle pattern and predict an increased need for cooling or a decreased need for cooling as the haul truck moves between the pickup and dump sites. Thus, sensing the position of the truck 11 using a GPS sensor 224 (FIG. 3) may be very useful. Further, because the route between the pickup site and the dumpsite may include uphill and downhill portions, the grade sensor 222 as shown in FIG. 3 may also be important.

The disclosed fan control system 200 may be applicable to any machine that performs substantially repetitive work cycles. In a more detailed example, at time to, the excavator 10 may be performing a truck-loading work cycle pattern as illustrated in FIG. 1 while attempting to dig a relatively dense material. At this time, the coolant temperature may be about 80° C. Since the dig segment consumes a large amount of power, the engine 101 operates at a full load condition and generates significant amounts of heat. Due to the time lag required for the coolant temperature to increase as a result of the dig segment, it will take minutes for the coolant temperature to increase and reach a differential set value (e.g., 90° C.) that triggers an increase in the fan speed. Further, by the time the coolant temperature reaches the predetermined set value, the excavator 10 might have already completed the dig segment and the lift segment and begun the first swing segment. The power use decreases during swing segment and less heat is generated by the engine 101. During the dump segment, the heat transfer level is even lower than the swing segments. An ideal fan speed would provide a larger airflow during the dig and lift segments than during the swing and dump segments.

To vary the fan speed according to the needs of each segment of a work cycle pattern, the fan control system 200 includes the pattern recognition sub-module 235, which can determine the probability of a work cycle match between the activity currently being undertaken by the excavator 10 and one of the stored work cycle patterns. If the probability of a match is about 90%, then the first parenthetical expression of equation (2) below becomes insignificant and the second parenthetical of equation (2) dominates:

$$\text{Desired Fan Speed} = (1 - P_{m\_cycle}) * S_0 + P_{m\_cycle} * (N_1 * S_1 + N_2 * S_2 + \ldots + N_m * S_m) \quad (2)$$

Because the first parenthetical, $(1 - P_{m\_cycle}) * S_0$, is a thermal model and the second parenthetical, $P_{m\_cycle} * (N_1 * S_1 + N_2 * S_2 + \ldots + N_m * S_m)$, is based on a recognized work cycle pattern, the desired fan speed is based more on the recognized work cycle pattern than on a thermal model.

For example, at time to, the machine or excavator 10 starts to dig segment for a relatively dense material, and the coolant temperature is about 80° C. According to a thermal model, the desired fan speed may be about 1200 rpm. However, a predetermined work cycle pattern may show the desired fan speed for the dig, lift, swing and dump segments to be 1600 rpm, 1500 rpm, 1200 rpm and 1000 rpm respectively. Accordingly, step 249 (FIG. 5) will also determine the weighting factors for the segments of work cycle. For example, the weighting factor for the dig, lift, swing and dump segment are 80%, 10%, 5% and 5% respectively. According to equation (2), the desired fan speed is about 10% based on the thermal model and about 90% based on the predetermined work cycle pattern. As a result, the desired fan speed is 1506 rpm instead of 1200 rpm. When this fan speed is implemented, more airflow can increase the heat transfer between the coolant in the radiator 103 and ambient air. The increased cooling effect can avoid thermal stress during dig segments while maintaining a more stable coolant temperature.

While only certain embodiments of been set forth, alternative embodiments and various modifications will be apparent from the above description to those skilled in the art. These and other alternatives are considered equivalents and within the spirit and scope of the present disclosure.

What is claimed:

1. A method for proactively controlling a fan speed of a cooling fan for a machine, the machine carrying out a plurality of repetitive work cycles, the machine including a plurality of machine sensors for detecting current operating conditions of the machine, the machine further including at least one controller linked to the plurality of machine sensors, the controller including a memory, the method comprising:
storing a plurality of work cycle patterns in the memory of the controller, each work cycle pattern including a plurality of consecutive segments and at least one fan speed for each segment;
periodically sensing current operating conditions of the machine;
identifying a work cycle pattern stored in the memory that is being repeated by the machine;
periodically adjusting the fan speed to meet cooling requirements of the segments of the identified work cycle pattern as the machine repeats the work cycle pattern.

2. The method of claim 1 further including limiting the periodic adjusting of the fan speed to meet the cooling requirements of the identified work cycle pattern to a predetermined rate of change limit.

3. The method of claim 1 wherein the periodic adjusting of the fan speed to meet the periodic cooling requirements of the identified work cycle pattern includes:
sensing a current fan speed;
identifying a desired fan speed from the identified work cycle pattern;
determining a difference between the current fan speed and the desired fan speed, and
if the difference is less than a predetermined rate of change limit, changing the current fan speed to the desired fan speed and,
if the difference is more than the predetermined rate of change limit, changing the current fan speed by an amount less than or equal to the predetermined rate of change limit.

4. The method of claim 1 wherein the plurality of machine sensors is selected from a group consisting of a fan speed sensor, an engine oil temperature sensor, a coolant temperature sensor, a selective catalytic reduction (SCR) catalyst temperature sensor, an engine speed sensor, a transmission fluid temperature sensor, a transmission gear ratio sensor, a hydraulic fluid temperature sensor, a payload sensor, a grade sensor, an ambient air temperature sensor, and a global positioning system (GPS) sensor.

5. The method of claim 1 wherein each segment of each work cycle pattern stored in the memory including at least one gain offset vector and at least one weighting factor used to calculate a desired fan speed for each segment.

6. The method of claim 1 wherein the periodic sensing of the current operating conditions of the machine further includes identifying a repeating work cycle from the periodic sensing of the current operating conditions, and
the identifying of the work cycle pattern stored in the memory further includes calculating a match probability based on a comparison of the identified repeating work cycle and the identified work cycle pattern.

7. An adaptive fan speed control system for controlling a fan that cools an engine of a machine, the machine also including a transmission, the system comprising:
a plurality of machine sensors for detecting current operating conditions of the machine, a plurality of engine sensors for detecting current operating conditions of the engine and at least one transmission sensor for detecting current operating conditions of the transmission, the machine further including at least one controller linked to the plurality of machine, engine and transmission sensors,
the controller including a memory with a plurality of work cycle patterns stored in the memory, each work cycle pattern including a plurality of segments and a plurality of fan speeds with one fan speed designated for each segment of each work cycle pattern;
the controller linked to the fan for controlling fan speed;
the controller configured to identify one of the plurality of work cycle patterns stored in the memory that is being repeatedly carried out by the machine;
the controller further configured to periodically adjust the fan speed for each segment of the identified work cycle pattern to meet the periodic cooling requirements of the identified work cycle pattern as the machine repeats the identified work cycle pattern.

8. The system of claim 7 wherein the controller is further configured to limit the periodic adjusting of the fan speed for each segment to a predetermined rate of change limit.

9. The system of claim 7 wherein the controller is further configured to carry out the periodic adjusting of the fan speed by:
determining a current fan speed;
determining a desired fan speed from the identified work cycle pattern;
determining a difference between the current fan speed and the desired fan speed, and
if the difference is less than a predetermined rate of change limit, the controller is configured to change the current fan speed to the desired fan speed and,
if the difference is more than the predetermined rate of change limit, the controller is further configured to change the current fan speed by an amount less than or equal to the predetermined rate of change limit.

10. The system of claim 7 wherein the plurality of machine, engine and transmission sensors is selected from a group consisting of a fan speed sensor, an engine oil temperature sensor, a coolant temperature sensor, a selective catalytic reduction (SCR) catalyst temperature sensor, an engine speed sensor, a transmission fluid temperature sensor, a transmission gear ratio sensor, a hydraulic fluid temperature sensor, a payload sensor, a grade sensor, an ambient air temperature sensor, and a global positioning system (GPS) sensor.

11. The system of claim 7 wherein each of the work cycle patterns stored in the memory of the controller include a plurality of consecutive segments, each segment including at least one gain offset vector and at least one weighting factor used to calculate a desired fan speed for each segment.

12. The system of claim 7 wherein the controller is configured to identify one of the plurality of work cycle patterns stored in the memory that is being repeatedly carried out by the machine by calculating a match probability based on a comparison of a repeating work cycle being carried out by the machine and the identified work cycle pattern.

13. A machine, comprising:
an engine,
a transmission,
a plurality of machine sensors for detecting current operating conditions of the machine, a plurality of engine sensors for detecting current operating conditions of the engine and at least one transmission sensor for detecting current operating conditions of the transmission, the machine further including at least one controller linked to the plurality of machine, engine and transmission sensors,
the controller including a memory with a plurality of work cycle patterns stored in the memory, each work cycle pattern including a plurality of segments and a plurality of fan speeds with one fan speed designated for each segment;
the controller linked to the fan for controlling fan speed;
the controller configured to identify one of the plurality of work cycle patterns stored in the memory that is being repeatedly carried out by the machine;
the controller further configured to periodically adjust the fan speed for each segment of the identified work cycle pattern to meet the periodic cooling requirements of the identified work cycle pattern as the machine repeats the identified work cycle pattern.

14. The machine of claim 13 wherein the controller is further configured to limit the periodic adjusting of the fan speed for each segment to a predetermined rate of change limit.

15. The machine of claim 13 wherein the controller is further configured to carry out the periodic adjusting of the fan speed by:
determining a current fan speed;
determining a desired fan speed from the identified work cycle pattern;
determining a difference between the current fan speed and the desired fan speed, and
if the difference is less than a predetermined rate of change limit, the controller is configured to change the current fan speed to the desired fan speed and,
if the difference is more than the predetermined rate of change limit, the controller is further configured to change the current fan speed by an amount less than or equal to the predetermined rate of change limit.

16. The machine of claim 13 wherein the plurality of machine, engine and transmission sensors is selected from a group consisting of a fan speed sensor, an engine oil temperature sensor, a coolant temperature sensor, a selective catalytic reduction (SCR) catalyst temperature sensor, an engine speed sensor, a transmission fluid temperature sensor, a transmission gear ratio sensor, a hydraulic fluid temperature sensor, a payload sensor, a grade sensor, an ambient air temperature sensor, and a global positioning system (GPS) sensor.

17. The machine of claim 13 wherein each of the work cycle patterns stored in the memory of the controller include a plurality of consecutive segments, each segment including at least one gain offset vector and at least one weighting factor used to calculate the desired fan speed for each segment.

18. The machine of claim 13 wherein each of the work cycle patterns stored in the memory of the controller includes the plurality of consecutive segments, each segment including at least one gain offset vector and at least one weighting factor used to calculate a desired fan speed for each segment.

19. The machine of claim 13 wherein the machine is an excavator.

20. The machine of claim 13 wherein the machine is a haul truck repeatedly moving along a route between a load pick-up site and a load dump site, the machine further including a GPS system linked to the controller for transmitting data regarding the route and a current position of the haul truck on the route.

* * * * *